(12) United States Patent
Linkola et al.

(10) Patent No.: US 9,177,012 B2
(45) Date of Patent: *Nov. 3, 2015

(54) MAINTENANCE OF SUBSCRIBER HISTORY FOR SERVICE SUPPORT APPLICATIONS IN AN IP-BASED TELECOMMUNICATIONS SYSTEM

(71) Applicant: T-Mobile USA, Inc., Bellevue, WA (US)

(72) Inventors: Janne P. Linkola, Espoo (FI); Christopher E. Caldwell, Woodstock, GA (US)

(73) Assignee: T-Mobile USA, Inc., Bellevue, WA (US)

( * ) Notice: Subject to any disclaimer, the term of this patent is extended or adjusted under 35 U.S.C. 154(b) by 90 days.

This patent is subject to a terminal disclaimer.

(21) Appl. No.: 13/736,914

(22) Filed: Jan. 8, 2013

(65) Prior Publication Data

US 2013/0121291 A1    May 16, 2013

Related U.S. Application Data

(63) Continuation of application No. 11/552,096, filed on Oct. 23, 2006, now Pat. No. 8,351,420.

(51) Int. Cl.
*H04W 74/00* (2009.01)
*G06F 17/30* (2006.01)
(Continued)

(52) U.S. Cl.
CPC ....... *G06F 17/30386* (2013.01); *H04M 7/0084* (2013.01); *H04W 24/00* (2013.01);
(Continued)

(58) Field of Classification Search
CPC ........ H04B 1/18; H04W 24/00; H04W 80/04; H04W 76/02; H04W 4/001; H04W 4/002; H04W 40/24; H04W 74/002; G06F 17/30386
See application file for complete search history.

(56) References Cited

U.S. PATENT DOCUMENTS

| | | |
|---|---|---|
| 5,937,044 A | 8/1999 | Kim |
| 5,956,024 A | 9/1999 | Strickland et al. |

(Continued)

FOREIGN PATENT DOCUMENTS

| | | |
|---|---|---|
| EP | 1227694 | 7/2002 |
| WO | WO-9815108 | 4/1998 |

(Continued)

OTHER PUBLICATIONS

International Search Report and Written Opinion, PCT Patent Application No. PCT/US2006/041225, mailed Mar. 19, 2008, 10 pages.

(Continued)

*Primary Examiner* — Anez Ebrahim
(74) *Attorney, Agent, or Firm* — Perkins Coie LLP

(57) ABSTRACT

A facility for maintaining a subscriber history pertaining to the use of a mobile device with an IP-based telecommunications service offered by a service provider. When a connection request is made by a mobile device to access an IP-based telecommunications service, one or more identifiers associated with the requesting mobile device and access point are provided in the request and stored by the facility. In some cases, the identifiers are stored even if the mobile device is unable to, or not authorized to, access the telecommunications service. Additional parameters associated with the request from the mobile device, such as a time stamp and details of a subsequent telecommunications session, are also associated with the stored request. The history of requests to access the IP-based telecommunications service from the mobile device are maintained by the facility and provided to a service support provider.

21 Claims, 8 Drawing Sheets

(51) Int. Cl.
*H04M 7/00* (2006.01)
*H04W 24/00* (2009.01)
*H04M 3/51* (2006.01)
*H04W 76/02* (2009.01)
*H04W 80/04* (2009.01)
*H04M 15/00* (2006.01)

(52) U.S. Cl.
CPC .............. *H04W74/002* (2013.01); *H04M 3/51* (2013.01); *H04M 15/58* (2013.01); *H04W 76/02* (2013.01); *H04W 80/04* (2013.01)

(56) References Cited

U.S. PATENT DOCUMENTS

| | | | |
|---|---|---|---|
| 6,704,412 | B1 | 3/2004 | Harris et al. |
| 6,781,959 | B1 | 8/2004 | Garakani et al. |
| 6,785,535 | B2 | 8/2004 | Lucidarme et al. |
| 7,012,888 | B2 | 3/2006 | Schoeneberger et al. |
| 7,079,850 | B2 | 7/2006 | Cameron et al. |
| 7,768,983 | B2 | 8/2010 | Nylander et al. |
| 8,145,190 | B2 | 3/2012 | Caldwell et al. |
| 8,351,420 | B2 | 1/2013 | Linkola et al. |
| 2001/0036224 | A1 | 11/2001 | Demello et al. |
| 2001/0048713 | A1 | 12/2001 | Medlock et al. |
| 2001/0048714 | A1 | 12/2001 | Jha |
| 2002/0013797 | A1 | 1/2002 | Jha et al. |
| 2002/0018518 | A1 | 2/2002 | Subramanian et al. |
| 2002/0031166 | A1 | 3/2002 | Subramanian et al. |
| 2002/0062472 | A1 | 5/2002 | Medlock et al. |
| 2003/0046413 | A1* | 3/2003 | Sakakura ............ 709/229 |
| 2003/0081580 | A1 | 5/2003 | Vaidyanathan et al. |
| 2003/0109265 | A1 | 6/2003 | Yamamoto et al. |
| 2004/0014423 | A1 | 1/2004 | Croome et al. |
| 2004/0077331 | A1* | 4/2004 | King ................ 455/405 |
| 2004/0192211 | A1 | 9/2004 | Gallagher et al. |
| 2004/0233930 | A1 | 11/2004 | Colby |
| 2005/0170818 | A1 | 8/2005 | Netanel et al. |
| 2005/0181805 | A1 | 8/2005 | Gallagher |
| 2005/0186948 | A1 | 8/2005 | Gallagher et al. |
| 2005/0216421 | A1* | 9/2005 | Barry et al. ............ 705/64 |
| 2005/0233733 | A1 | 10/2005 | Roundtree et al. |
| 2005/0239441 | A1 | 10/2005 | Eronen |
| 2005/0255879 | A1 | 11/2005 | Shi et al. |
| 2005/0265279 | A1 | 12/2005 | Markovic et al. |
| 2005/0266853 | A1 | 12/2005 | Gallagher et al. |
| 2005/0271008 | A1 | 12/2005 | Gallagher et al. |
| 2005/0272424 | A1 | 12/2005 | Gallagher et al. |
| 2005/0272449 | A1 | 12/2005 | Gallagher et al. |
| 2005/0282534 | A1 | 12/2005 | Subramanian et al. |
| 2005/0286466 | A1 | 12/2005 | Tagg et al. |
| 2006/0003757 | A1 | 1/2006 | Subramanian et al. |
| 2006/0035646 | A1 | 2/2006 | Fox et al. |
| 2006/0045057 | A1 | 3/2006 | Nylander et al. |
| 2006/0045069 | A1* | 3/2006 | Zehavi et al. ............ 370/352 |
| 2006/0052113 | A1 | 3/2006 | Ophir et al. |
| 2006/0058020 | A1 | 3/2006 | Fox et al. |
| 2006/0058021 | A1 | 3/2006 | Fox et al. |
| 2006/0062225 | A1 | 3/2006 | Li |
| 2006/0068784 | A1 | 3/2006 | Fox et al. |
| 2006/0079228 | A1 | 4/2006 | Marsico et al. |
| 2006/0099935 | A1 | 5/2006 | Gallagher et al. |
| 2006/0168018 | A1* | 7/2006 | Levin et al. ............ 709/206 |
| 2006/0223497 | A1 | 10/2006 | Gallagher et al. |
| 2006/0268902 | A1 | 11/2006 | Bonner |
| 2006/0274703 | A1 | 12/2006 | Connelly |
| 2008/0125077 | A1 | 5/2008 | Velazquez et al. |
| 2010/0048165 | A1 | 2/2010 | Caldwell et al. |

FOREIGN PATENT DOCUMENTS

| | | |
|---|---|---|
| WO | WO-2005079087 | 8/2005 |
| WO | WO-2006031927 | 3/2006 |
| WO | WO-2008051872 | 5/2008 |

OTHER PUBLICATIONS

International Search Report and Written Opinion, PCT Patent Application PCT/US2007/082007, mailed Mar. 11, 2008, 6 pages.
European Patent Office, Extended European Search Report, EP Patent Application 06825742.7, mailed Aug. 11, 2014, 9 pages.
European Patent Office, Extended European Search Report, EP Patent Application 06826443.1, mailed Aug. 11, 2014, 10 pages.

* cited by examiner

MAINTENANCE OF SUBSCRIBER HISTORY FOR SERVICE SUPPORT APPLICATIONS IN AN IP-BASED TELECOMMUNICATIONS SYSTEM

CROSS-REFERENCES TO RELATED APPLICATIONS

This application is a continuation application of U.S. patent application Ser. No. 11/552,096, filed on Oct. 23, 2006, and entitled "MAINTENANCE OF SUBSCRIBER HISTORY FOR SERVICE SUPPORT APPLICATIONS IN AN IP-BASED TELECOMMUNICATIONS SYSTEM," now U.S. Pat. No. 8,351,420, which is hereby incorporated herein in its entirety by reference.

BACKGROUND

A variety of technologies enable telecommunication services to be offered using Internet Protocol (IP). Commonly referred to as Voice over IP, or VoIP, such technologies enable telecommunications on any public or private IP network, including the Internet. VoIP technology permits a user to receive IP-based telecommunications services through a variety of devices, including a desktop computer, a notebook computer, an analog handset used in conjunction with a VoIP telephone adapter, a VoIP-enabled handset, or other like device.

Increasingly, mobile devices, such as notebook computers, personal digital assistants (PDAs), wireless handhelds, wireless handsets, or other similar devices, are also being enabled to receive IP-based telecommunications services. Such services are provided by enabling the mobile device to communicate with a wireless router and access any IP-based wireless access network, such as a network based on the IEEE 802.16 (WiMAX), IEEE 802.20 Mobile Broadband Wireless Access (MBWA), Ultra Wideband (UWB), 802.11 wireless fidelity (Wi-Fi), and Bluetooth standards.

Moreover, dual-mode mobile telecommunications devices may be enabled to communicate with any IP-based wireless access network. For instance, Unlicensed Mobile Access (UMA) technology allows wireless service providers to merge cellular networks, such as Global System for Mobile Communications (GSM) networks, and IP-based wireless networks into one seamless service with one mobile device, one user interface, and a common set of network services for both voice and data. UMA technology has recently been accepted into release 6 of the 3rd Generation Partnership Project (3GPP) standard as a General Access Network (GAN).

With UMA solutions, subscribers may move between cellular networks and IP-based wireless networks with seamless voice and data session continuity as transparently as they move between cells within the cellular network. Seamless in-call handover between the IP-based wireless network and cellular network ensures that the user's location and mobility do not affect the services delivered to the user. Services may be identical whether connected over the IP-based wireless network or the cellular network. UMA technology effectively creates a parallel radio access network, the UMA network, which interfaces to the mobile core network using standard mobility-enabled interfaces. The mobile core network remains unchanged. The common mobile core network makes it possible for the service provider to take advantage of full service and operational transparency. For example, the existing service provider Business Support Systems (BSS), service delivery systems, content services, regulatory compliance systems, and Operation Support Systems (OSS) can support the UMA network with little or no change. Service enhancements and technology evolution of the mobile core network apply transparently to both cellular access and UMA.

Although IP-based telecommunications technologies offer substantial benefits to users of the technology, service providers face many obstacles to the widespread use of these technologies. One of the challenges facing any service provider that launches an IP-based telecommunications service is service support. Service support includes customer care operations, service diagnostic operations, and related operations. Service support issues are particularly challenging in an IP-based telecommunications network because the service provider typically does not have end-to-end control of the network used by a subscriber. Instead, any communications between mobile devices used by subscribers and the network systems of the service provider may involve some transit over third-party broadband networks and the Internet. Since the third-party networks and the Internet are not under the control of the service provider, diagnosing service problems is particularly complicated. Performance problems may result from problems in one or more components that make up the service provider network, the third-party network, and/or the Internet. In order to provide subscribers with a high quality of service and diagnose service problems as quickly as possible, it is therefore important that service providers implement a robust service support solution that allows service support representatives to quickly and easily troubleshoot service problems.

DETAILED DESCRIPTION

Figure 1:
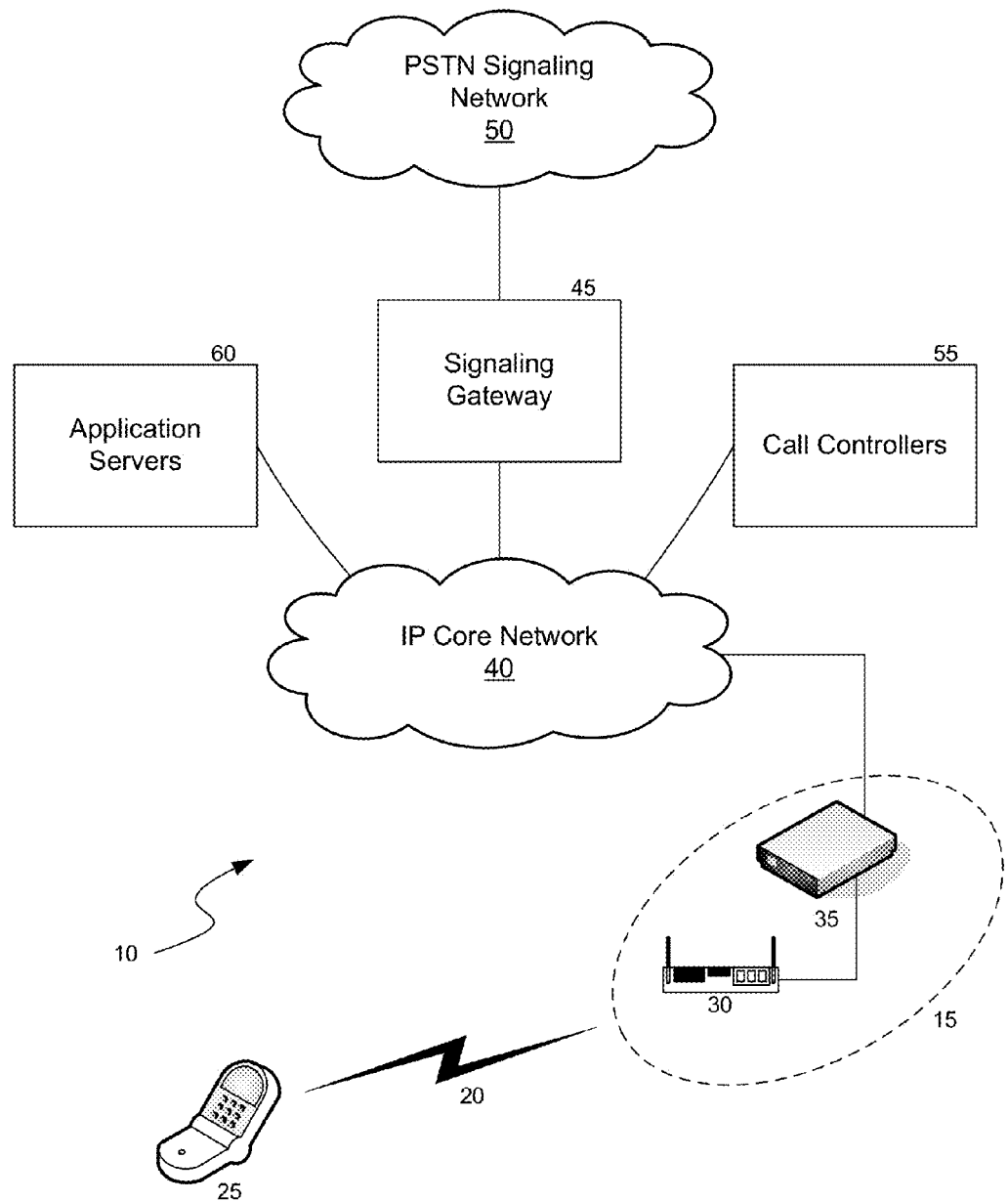
FIG. 1 illustrates an example Voice over IP system.

A software and/or hardware facility is disclosed for maintaining a subscriber history pertaining to the use of a mobile device with an IP-based telecommunications network, including but not limited to IP-based telecommunications networks converged with cellular telecommunications networks (such as a UMA service). When a connection request is made by a mobile device to access an IP-based wireless telecommunications network, one or more identifiers associated with the requesting mobile device and access point are provided in the request. The identifiers associated with the requesting mobile device and access point are stored by the facility. In some cases, the identifiers are stored even if the mobile device is unable to, or not authorized to, fully access the IP-based telecommunications service. Additional parameters associated with the request from the mobile device, such as a time stamp and details of a subsequent session, are also associated with the stored request. The history of requests to access the IP-based telecommunications service from the mobile device are maintained by the facility and provided to a service support provider. By using the access history, a service support provider may be able to quickly and easily resolve service problems such as a subscriber's inability to access the IP-based service via their mobile device.

In some embodiments of the facility, a service support interface is provided to allow service support personnel to easily review the subscriber history. The interface highlights groups of connection requests that failed, and allows the history to be sorted using a variety of sort keys. Service support personnel are thereby able to quickly focus on areas of potential problems and troubleshoot to identify service solutions.

In some embodiments of the facility specific to a converged network, the subscriber history is updated by the facility when more accurate information pertaining to some or all of the identifiers in the connection request becomes available. For example, one of the identifiers in a connection request may be a cell global identifier (CGI), or an identifier associated with a cell (GSM, CDMA or other) that the mobile device has previously accessed or is able to access when making the request to access the IP-based telecommunication service. Since the CGI may be used by the service provider for certain billing issues, the CGI associated with the connection request in the mobile device history may be updated by the service provider if a preferred CGI value is identified by the service provider.

The following description provides specific details for a thorough understanding of, and enabling description for, various embodiments of the technology. One skilled in the art will understand that the technology may be practiced without these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

I. Example VoIP and UMA Networks

FIG. 1 illustrates the components of a generalized Voice over Internet Protocol (VoIP) system 10 for mobile communication devices. The system comprises one or more access points (APs) 15 that can accept communications 20 from mobile devices 25. The access point includes a wireless router 30 and a broadband modem 35 that enable connection to an Internet Protocol (IP) network 40. IP network 40 may be one or more public networks, private networks, or combination of public and private networks. IP packets that carry communications from the mobile device 25 are received at the access point 15 and transported through the IP network 40 to a signaling gateway 45. Signaling gateway 45 is typically operated by a service provider and converts the VoIP signal to a traditional phone service signal. The phone signal is then conveyed to the intended recipient via a public switched telephone network (PSTN) 50. A call controller 55 that is located in the service provider's network provides call logic and call control functions. An application server 60 that is located in the service provider's network provides logic and execution of one or more applications or services that are offered by the server provider, such as implementing various access and security rules.

The VoIP system depicted in FIG. 1 is an architecture that broadly enables any mobile device to receive IP-formatted telecommunication services. One application of that technology is Unlicensed Mobile Access (UMA) technology, which allows cellular service providers to offer their products and services seamlessly over Internet-connected broadband networks. Mobile devices may utilize licensed spectrums (such as spectrums for cellular communications) and alternate licensed, semilicensed and unlicensed spectrums (such as spectrums that can be utilized for IP-based communication). For example, dual-mode cellular phones may access a cellular network, such as a GSM, CDMA, or other network network, or an IP-based wireless network, such as a network based on the IEEE 802.16 (WiMAX), IEEE 802.20 Mobile Broadband Wireless Access (MBWA), Ultra Wideband (UWB), 802.11 wireless fidelity (Wi-Fi), or Bluetooth standards. The IP-based networks are accessed via wireless access points that are typically connected to a DSL (Digital Subscriber Line) modem, a cable modem, a satellite modem, or any other broadband Internet connection. The access points may be open or closed, and may be located in a subscriber's home, in public locations such as coffee shops, libraries, or schools, or in corporate locations.

When a mobile device accesses an IP-based wireless network, information is initially formatted in the device's native cellular protocol (such as GSM or CDMA protocols) and then encapsulated into Internet Protocol (IP) packets, transmitted to the access point, and communicated over the Internet to the cellular service provider's mobile core network. Such transmission bypasses the service provider's existing network of radio towers. Because the same native cellular protocols are used in communications involving IP access points as with traditional radio towers, the cellular service provider maintains a large degree of system compatibility even though using an IP-based network. The systems of the cellular service provider that deliver content and handle mobility may not even need to be aware that a subscriber's mobile device is on an IP-based network. The system may instead assume the mobile device is on a cellular network. The IP-based network is therefore abstracted with respect to the cellular network, regardless of whether the mobile device connects to the cellular network via a cell tower (for licensed spectrum access) or a wireless access point (for licensed, semilicensed and unlicensed spectrum access).

A non-exhaustive list of products and services available on IP-based networks includes not only voice services, but also supplementary services like call forwarding and call waiting, text messaging services like SMS, and data-based services like ringtone downloads, game downloads, picture messaging, email and web browsing. Further, since a mobile device is connected to an IP network, all manner of data services available over such networks may be provided to the mobile device.

Figure 2A:
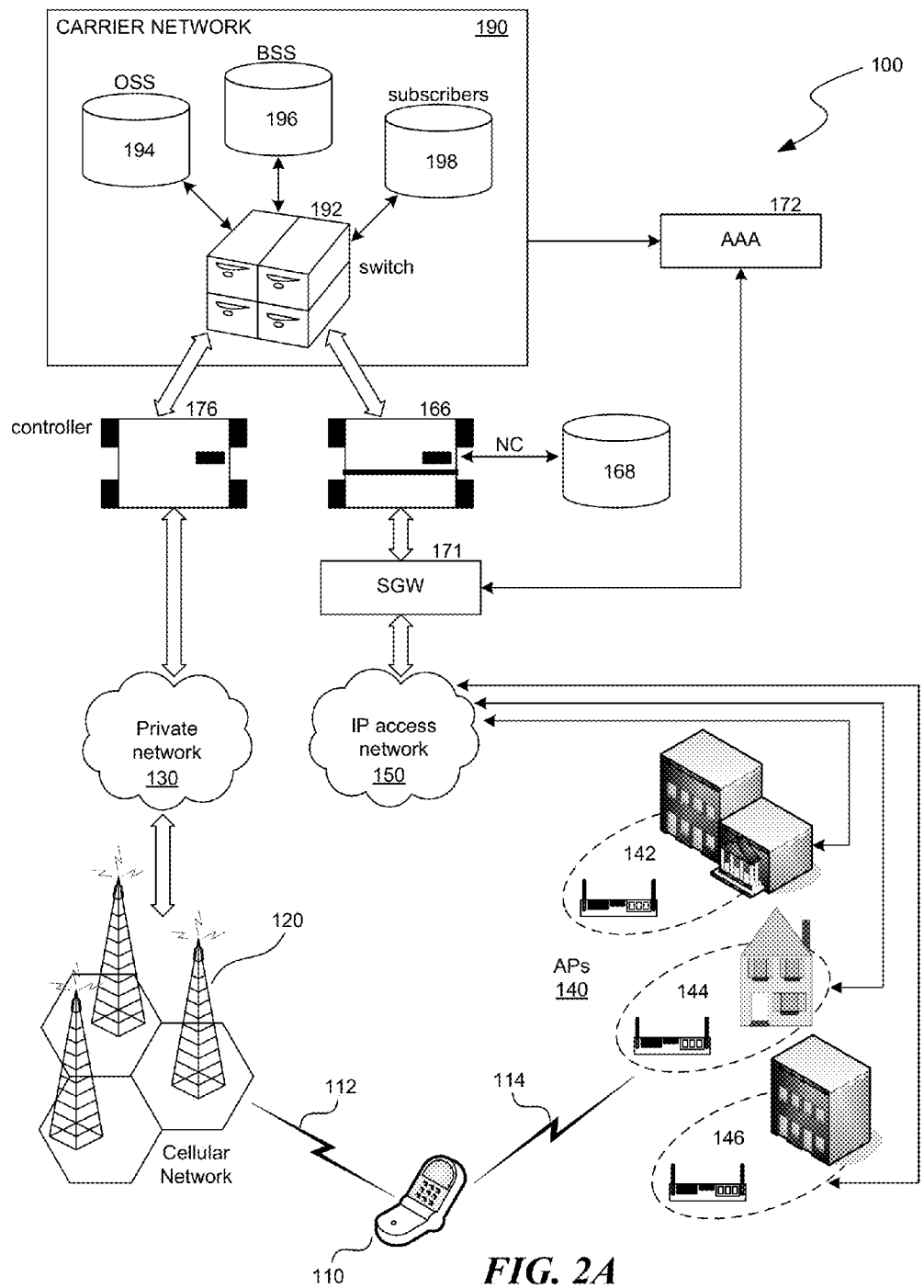
FIGS. 2A and 2B illustrate example converged wireless network systems that combine cellular networks with IP-based wireless telecommunications networks.

FIG. 2A is an illustration of a system 100 that combines a cellular telephone network with a IP-based wireless telecommunications network (e.g. a UMA network). The described system 100 accepts registration requests and communication connections from a mobile device 110 to either a cellular telephone network or to an IP-based wireless telecommunications network.

The example cellular telephone network includes one or more cell towers 120 that are configured to accept cellular communications 112 from mobile device 110. The cell towers 120 are connected to a controller (such as a base station controller/radio network controller (BSC/RNC)) 176 via a private network 130. The private network 130 can include a variety of connections such as T1 lines, a wide area network (WAN), a local area network (LAN), various network switches, and other similar components. Cell tower controller 176 controls network communication traffic to the carrier network 190, where all communications are managed. An example carrier network 190 includes a switch (such as a mobile switching center (MSC)) 192, which is configured to control data/call flows, perform load balancing, as well as other functions. A variety of system databases may also be accessed in the carrier network such as, e.g., an operation support subsystem (OSS) database 194, a business support system (BSS) database 196, and a central subscriber database that contains details of a carrier's subscribers (such as a home location register (HLR)) 198, for billing, call logging, etc.

The example IP-based wireless telecommunications network includes one or more access points (APs) 140 that can accept IP communications 114 from mobile device 110. An access point can be configured as part of a wireless network in one or more locations such as a public network 142, a home network 144, or a private business network 146. Each access point is coupled to an Internet Protocol (IP) network 150 through a broadband connection. IP packets that carry communications (data, voice, SMS, etc.) are routed from the access points to a security gateway (SGW) 171 through the IP network 150. The security gateway controls access to the network controller (NC) 166, which communicates with a database 168 for logging and accessing various data associated with communications. The network controller 166 is also configured to manage access with the carrier network 190 in a similar manner to that performed by the cell tower controller 176.

Authentication of a request for access by a mobile device over the IP-based wireless telecommunications network is handled by the security gateway 171, which communicates with an authentication, access and authorization (AAA) module 172 as shown in FIG. 2A. Challenges and responses to requests for access by the mobile device are communicated between a central subscriber database 198 and the AAA module 172. When authorization is granted, the security gateway 171 communicates the assignment of an IP address to the mobile device 110 that requested access. Once the IP address is passed to the mobile device 110 by the security gateway 171, the public IP address assigned to the device is passed to the NC.

Figure 2B:
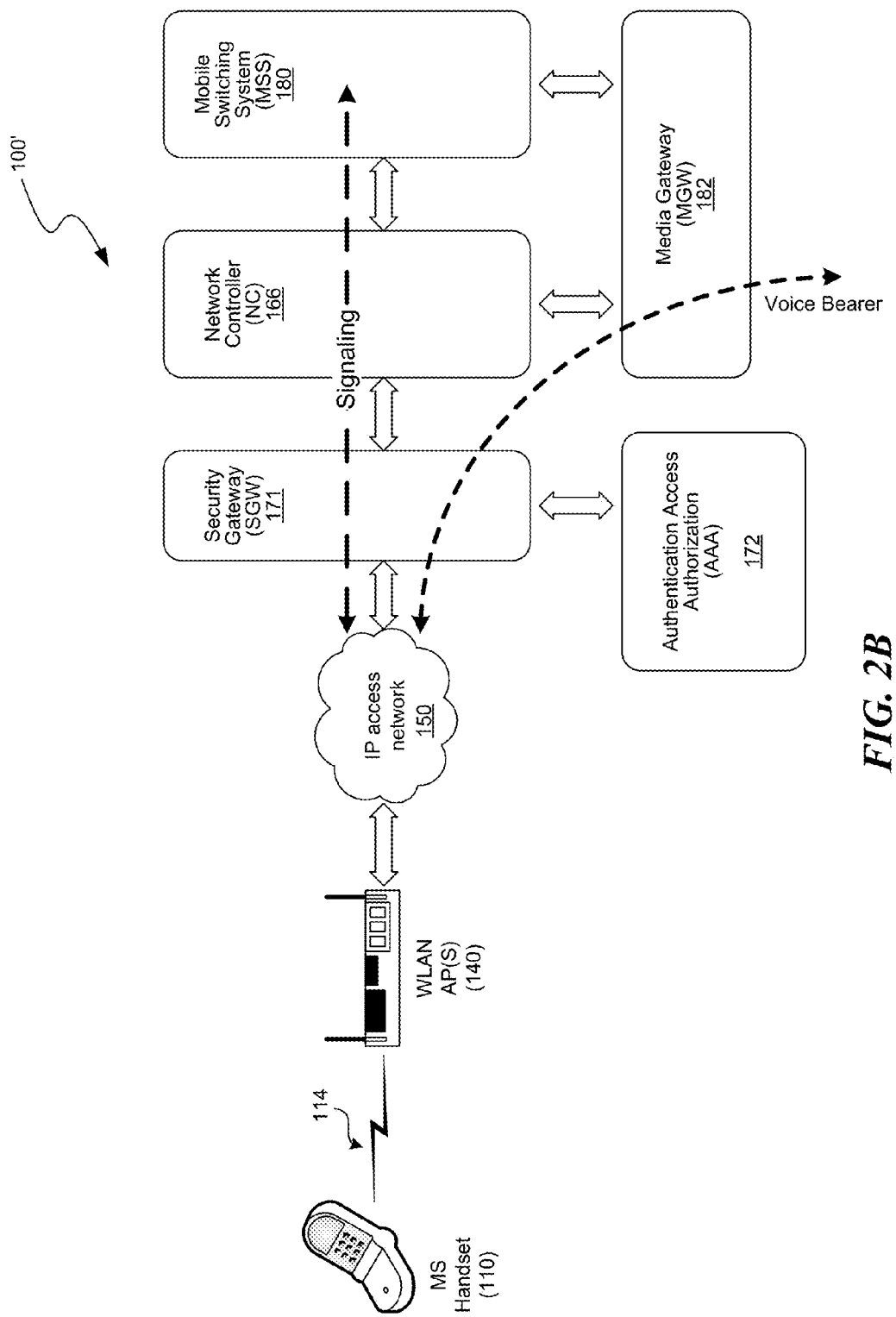

FIG. 2B illustrates another example system that combines a cellular telephone network with an IP-based wireless telecommunications network. The described system 100' accepts registration requests and communication connections from a mobile device 110 to either a cellular telephone network (not shown) or to an IP-based wireless telecommunications network. The system 100' includes one or more access points (AP) 140 that accept communications 114 from mobile device 110. Each access point is coupled to an Internet Protocol network 150 through a broadband connection. IP network 150 routes communications (data, voice, SMS, etc.) between the access points and a security gateway (SGW) 171. The security gateway 171 controls access to the network controller (NC) 166, which communicates with a database (not shown) for logging and accessing various data associated with communications. Authentication, access, and authorization are handled by SGW 171 via AAA module 172, as previously described.

For the example system 100', the path of a signaling communication is routed through the network controller 166 to a mobile switching system (MSS) 180, while the voice bearer path is routed through the network controller 166 to a media gateway (MGW) 182. The signaling portion of a communication governs various overhead aspects of the communication such as, for example, when the call starts, when the call stops, initiating a telephone ring, characteristics of the transmitted data, etc. The voice bearer portion of the communication contains the actual content (either data or voice information) of the communication. The MGW 182 controls the content flow between the service provider and the mobile device 110, while the MSS 180 controls the signaling flow (or controls overhead-related flow) between the service provider and the mobile device 110.

Figure 3:
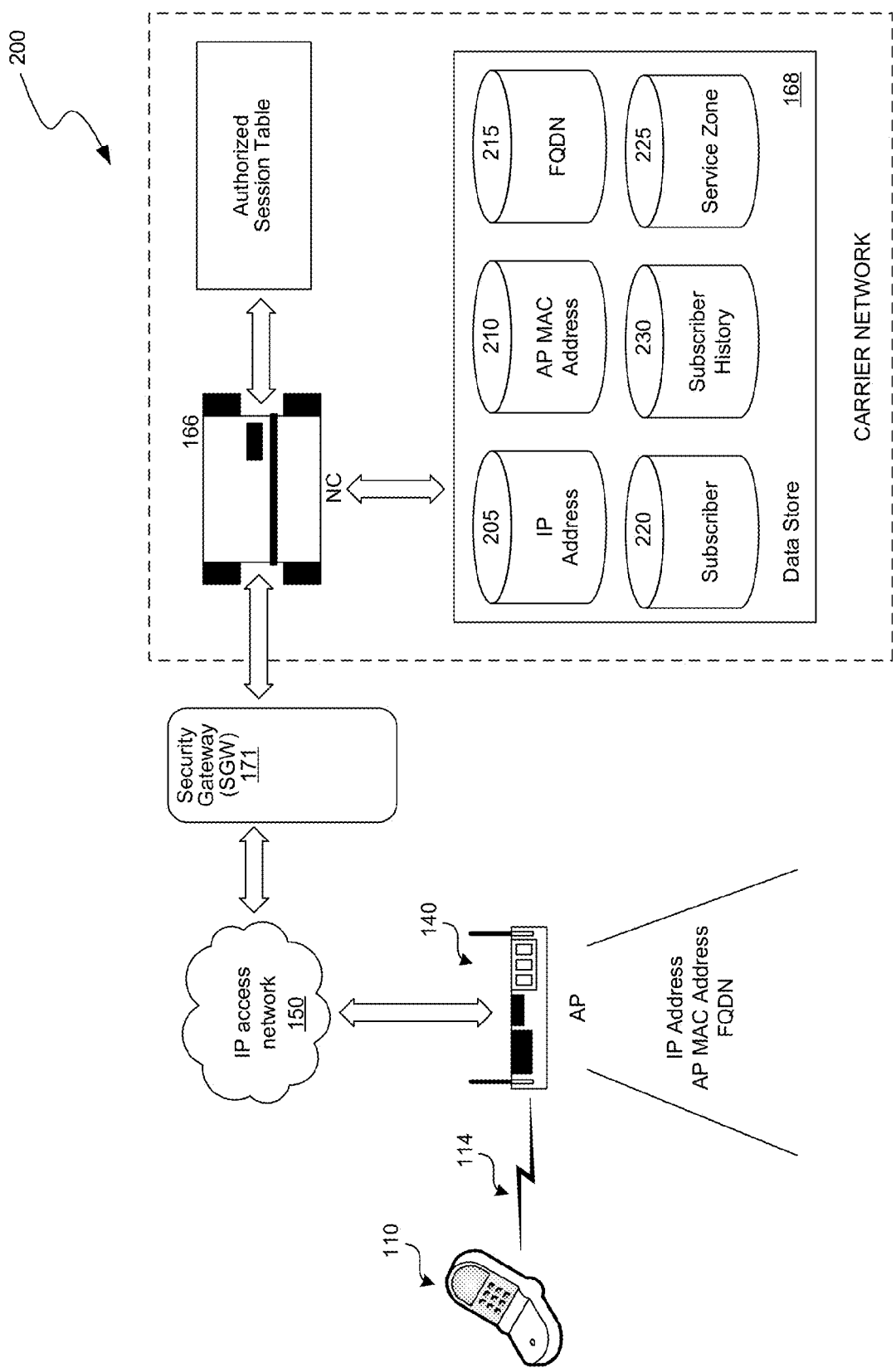
FIG. 3 illustrates a network controller configured in an IP-based telecommunications network to authorize or reject access to the network based on various identifiers.

FIG. 3 illustrates a configuration that utilizes a network controller for managing IP-based wireless telecommunications network authorization. A mobile device 110 initiates a connection request with a IP-based wireless telecommunications network via a wireless communication 114 to an access point (AP) 140. The access point 140 communicates with a network controller 166 via an IP access network 150 and a security gateway (SGW) 171. The network controller 166 monitors connection requests associated with each mobile device, processes each connection request, and either permits or rejects access to the IP-based wireless telecommunications network. Access to the IP-based wireless telecommunications network may be controlled based on at least one identifier that is associated with the mobile device. The network controller 166 queries a data store 168 to determine if the mobile device is authorized for access to the IP-based wireless telecommunications network. The data store includes a number of data storage areas containing various system data that is used in the authorization process. For example, the data store may comprise an IP address list 205 of Internet Protocol (IP) addresses (or "Public IP address") associated with access points, a MAC address list 210 with media access control (MAC) addresses associated with access points, a fully qualified domain name (FQDN) list 215, a subscriber list 220 that includes mobile device or subscriber identifiers (such as International Mobile Subscriber Identifiers (IMSIs)), a zone database, and other lists and databases that are not depicted but are discussed herein. As will be described in additional detail, one or more of the identifiers that are stored in the data store may be utilized to determine access to the system. The lists may include "blocked" identifiers as well as "authorized" identifiers. The data store may also contain a subscriber history database 230 for purposes of service support. The data store 168 may be a single database, table, list, catalog, or data structure for storage, or a combination of such elements. Authorized accesses to the IP-based wireless telecommunications network may be maintained by the network controller 166 in an authorized session table or similar data construct.

Figure 4:
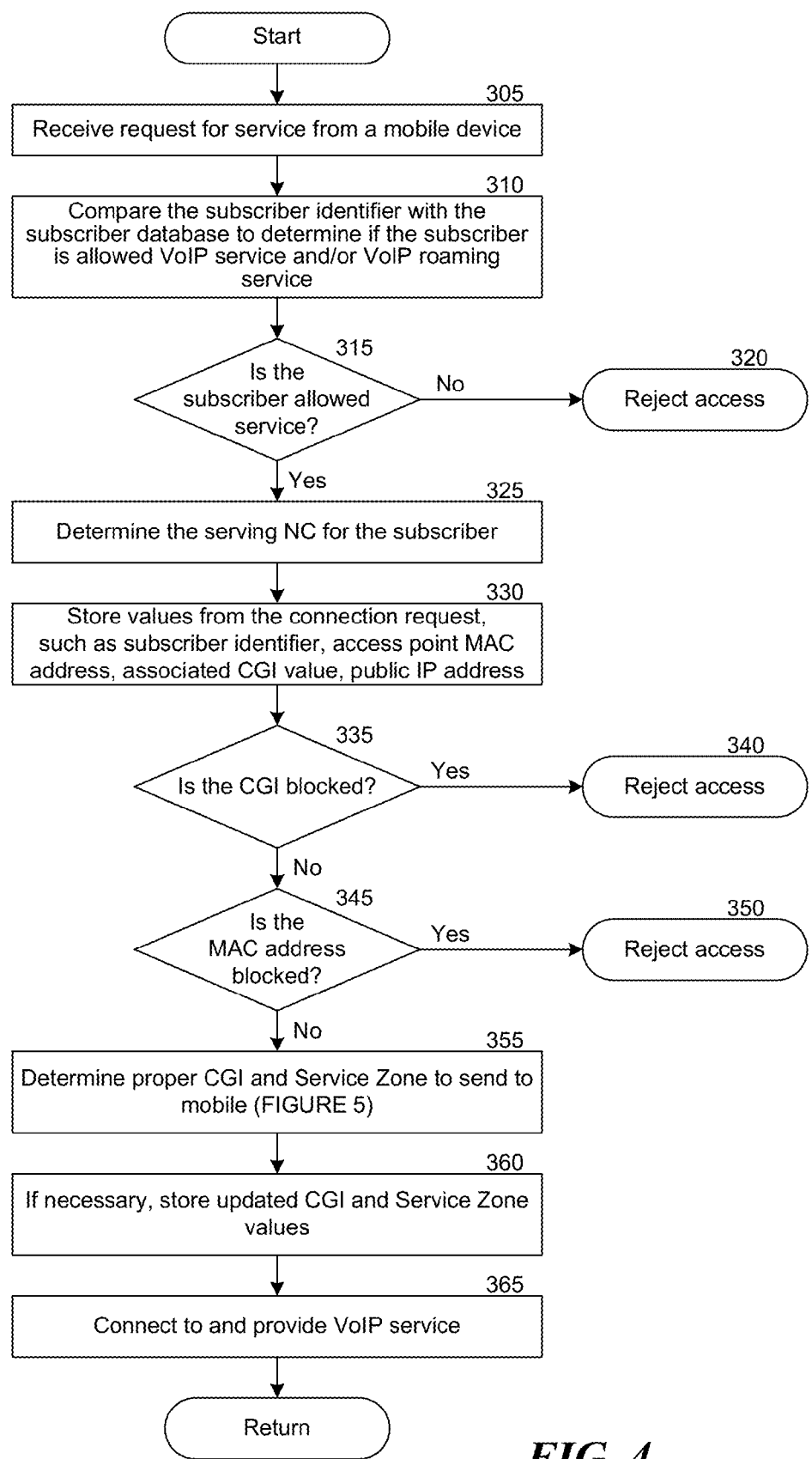
FIG. 4 is a flow chart of a registration process used by a mobile device to access an IP-based telecommunications network.

FIG. 4 is a flow chart that provides further detail about how a connection request received from a mobile device is processed in order to either permit or reject access to the IP-based wireless telecommunications network. At a block 305, a connection request is received from a mobile device. For purposes of this description, a connection request includes one or more communications between the mobile device, access point, and service provider network with sufficient information to evidence a request by the mobile device to access the VoIP service. The connection request may include the communication of one or more of the following identifiers: (i) a mobile device or subscriber identifier (such as an International Mobile Subscriber Identifier (MI)); (ii) a service set identifier (SSID) associated with the packets being communicated with the access point; (iii) a Cell Global Identifier (CGI) of the nearest co-extensive network cell that can be received by the mobile device or a cached value of the most recent network cell that was detected by the mobile device; (iv) a media access control (MAC) address associated with the access point; and (v) a public IP address and a private IP address (if assigned) associated with the access point connection to the Internet.

At a block 310, the authentication and access authorization module 172 compares the mobile device or subscriber identifier received in the connection request with the subscriber database to determine if the subscriber is allowed access to the VoIP service and/or VoIP roaming service. At a decision block 315, the facility determines whether the user of the mobile device has subscribed to receive VoIP service and/or VoIP roaming service. Users who have not subscribed to receive service are rejected by the authentication and access authorization module and the connection request denied at a termination block 320. For users who have subscribed to receive service, processing continues at a block 325.

At block 325, the facility redirects the subscriber to an appropriate serving network controller (NC) 166. While a single NC element is depicted in FIGS. 2A, 2B, and 3, it will be appreciated that typically a number of NCs are utilized by a service provider in order to manage network traffic. As a result, the facility selects an appropriate NC using such rules as assigning a default NC to the mobile device, assigning a service NC associated with the access point that is handling the connection request, or assigning other NCs in accordance with other service provider rules. Once the connection request is assigned to a serving NC, the mobile registration procedure continues at a block 330.

Figure 5:
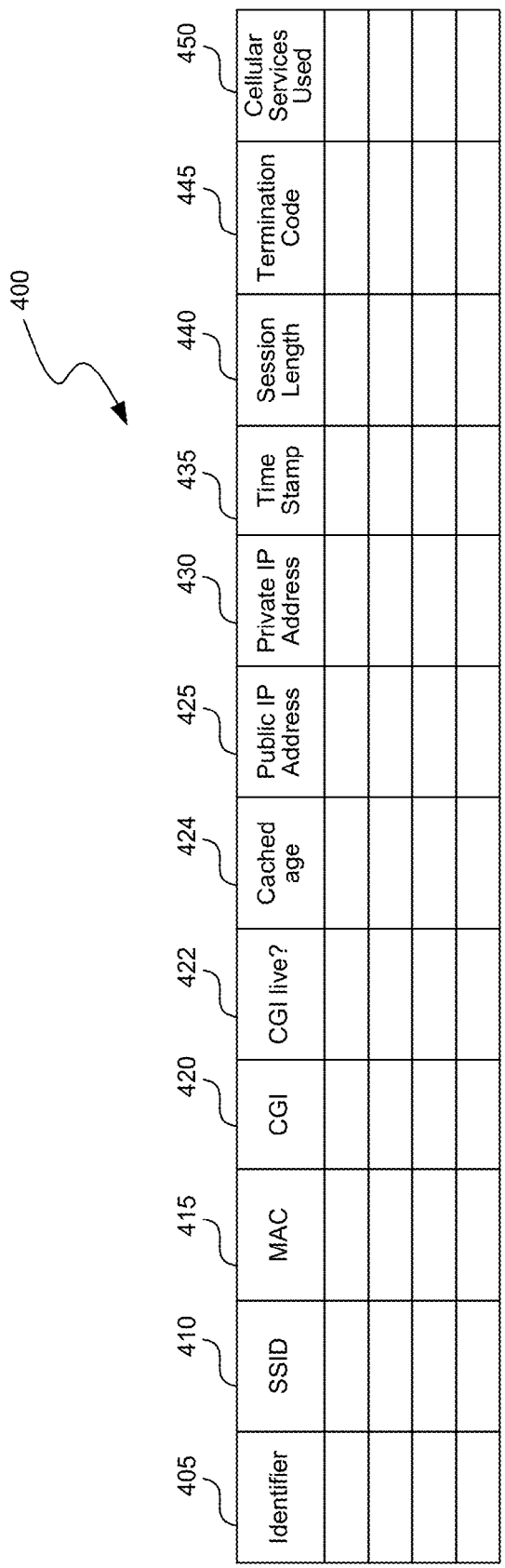
FIG. 5 is a subscriber history table stored by the IP-based telecommunications system and accessible by a service support provider.

At block 330, the facility stores one or more of the identifiers received in the connection request in the subscriber history database 230, including the mobile device or subscriber identifier, SSID, MAC address, CGI, or public and private IP address identifiers. FIG. 5 is a representative subscriber history table 400 associated with a particular subscriber. Each row in the subscriber history table 400 represents one connection request by the subscriber's mobile device. Each column in the subscriber history table 400 represents an identifier associated with the connection request or details of the subsequent session if the connection request is authorized. For example, a column 405 is provided to store the mobile device or subscriber identifier (such as an IMSI), a column 410 is provided to store the SSID associated with the packets being communicated with the access point, and a column 415 is provided to store a MAC address associated with the access point. Three columns are provided to store information about a detected network cell, including a column 420 to store the CGI of a co-extensive network cell that can be received by the mobile device or a cached network cell that was recently detected by the mobile device, a column 422 to store an indication of whether the CGI value is a live CGI (i.e., detectable by the mobile while in communication with the access point) or a cached CGI (i.e., previously detected by the mobile prior to communication with the access point), and a column 424 to store an indication of the age of the CGI value if the CGI value represents a cached CGI. Additional columns in the subscriber history table include columns 425 and 430, which store a public and private IP address associated with the access point connection to the Internet, and a column 435 to store a time stamp associated with when the connection request was received. Some or all of the data is stored in columns 405-435 of the subscriber history table 400 by the facility for each connection request by the subscriber's mobile device, regardless of whether the mobile device is ultimately authorized to use the VoIP service as a result of the connection request. In this fashion, the facility is able to track both successful and unsuccessful connection requests.

Additional columns are provided in the subscriber history table 400 to store details about the VoIP session if the connection request is authorized. A column 440 is provided to store a length of the VoIP session. The session length may be represented by an ending time stamp or by a number that reflects elapsed time (e.g., in minutes and seconds) from the time stamp associated with the connection request. A column 445 is provided to store a termination code that reflects how the session was ended. For example, a first code may indicate that the subscriber ended the session, and a second code may indicate that the session was dropped as a result of unacceptable delays introduced by Internet congestion. Those skilled in the art will appreciate that the termination codes may be expanded to include codes covering all typical termination events. As applicable in a converged network, column 450 is provided to store one or more identifiers that are reflective of the cellular services that were used by the subscriber during the VoIP session. Those skilled in the art will appreciate that additional columns may be added to the subscriber history table 400 if the additional information stored in the table might be valuable to service support representatives or other troubleshooters.

Returning to FIG. 4, once the identifiers associated with the connection request are stored, processing continues at a decision block 335. At decision block 335, the facility determines whether the CGI associated with the connection request has been blocked. That is, the facility determines whether a live CGI associated with the connection request has been deemed to be a mobile cell where VoIP service should not to be offered. If the CGI is blocked, at a termination block 340 the connection request is denied.

If the CGI is not blocked, processing continues to a decision block 345 where the facility determines whether the MAC address associated with the access point has been blocked. MAC addresses may be blocked for a variety of reasons, including for continuing to provide improper or invalid subscriber information in an attempt to access the VoIP service. If the MAC address is blocked, at a termination block 350 the connection request is denied.

Figure 6:
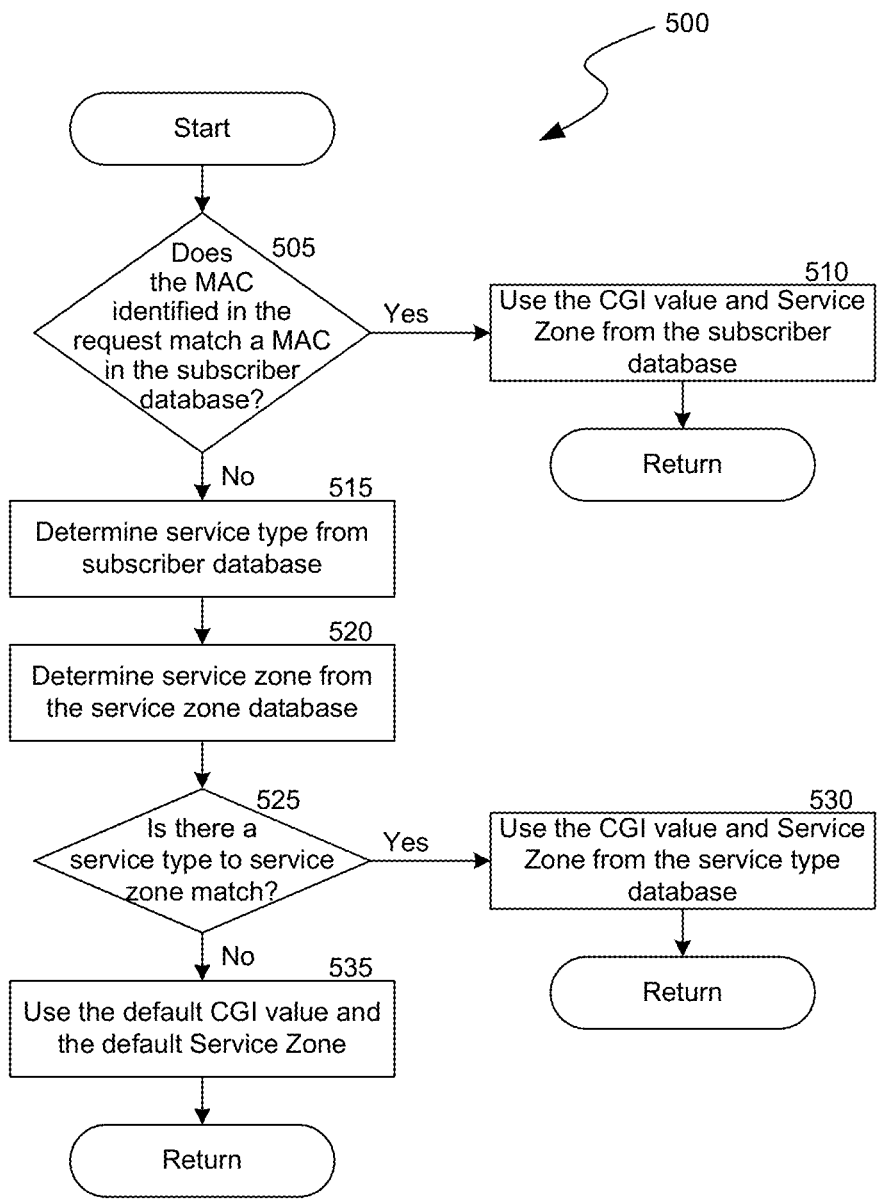
FIG. 6 is a flow chart of a method for determining the proper IP-based telecommunications service zone and CGI that are associated with a mobile device.

If the MAC address is not blocked, processing continues to a block 355 where the proper CGI and VoIP service zones are sent to the mobile device. FIG. 6 is a flow chart of a process 500 for determining the proper CGI and VoIP service zones for the mobile device. At a decision block 505, the facility determines whether the MAC address identified in the connection request matches a MAC address stored in the subscriber database. That is, the facility determines whether the access point through which the mobile device is making the connection request corresponds to an access point that is operated by a subscriber. If the MAC address matches a MAC address stored in the subscriber database, at a block 510 the facility uses the CGI value and service zone that are stored in the subscriber database. The values stored in the subscriber database are typically those values that were identified by the service provider as part of the original process of registering the access point to provide access to the IP-based wireless telecommunications system.

If the MAC address does not match a MAC address stored in the subscriber database at decision block 505, at a block 515 the facility determines the service type from the subscriber database. That is, the facility determines what type of service plan the subscriber has subscribed to with the service provider. The service plan selected by the subscriber will determine what value of CGI and service zone should be selected for billing purposes. At a block 520 the facility determines the service zone from the service zone database. The service zone database contains groups of known access points, IP addresses, and fully-qualified domain names for access points that have been approved by the service provider. For example, the service zone database may contain a list of all access points that are operated by the service provider at public locations.

At a decision block 525, the facility determines whether any of the service zones apply to the service type associated with the subscriber. If there is a match between the service type and the service zone, then at a block 530 the facility uses the CGI value and service zone from a Service Type database. The Service Type database stores the relationship between service types and the zones in the service zone database. If there is no match between the service plan and the service zone, then at a block 535 the facility uses a default CGI value and a default service zone as selected by the service provider. Following identification of the appropriate CGI value and service zone, processing continues to block 360 of FIG. 4.

At block 360, the facility updates the CGI value that is stored in the subscriber history table 400 if the CGI value has changed as a result of the outcome of process 500 for determining the proper CGI and service zone. Updating the subscriber history table ensures that the subscriber history is accurately maintained for billing and service support purposes. At a block 365, the facility allows the mobile device to connect to the IP-based wireless telecommunications network and receive VoIP service.

Figure 7:
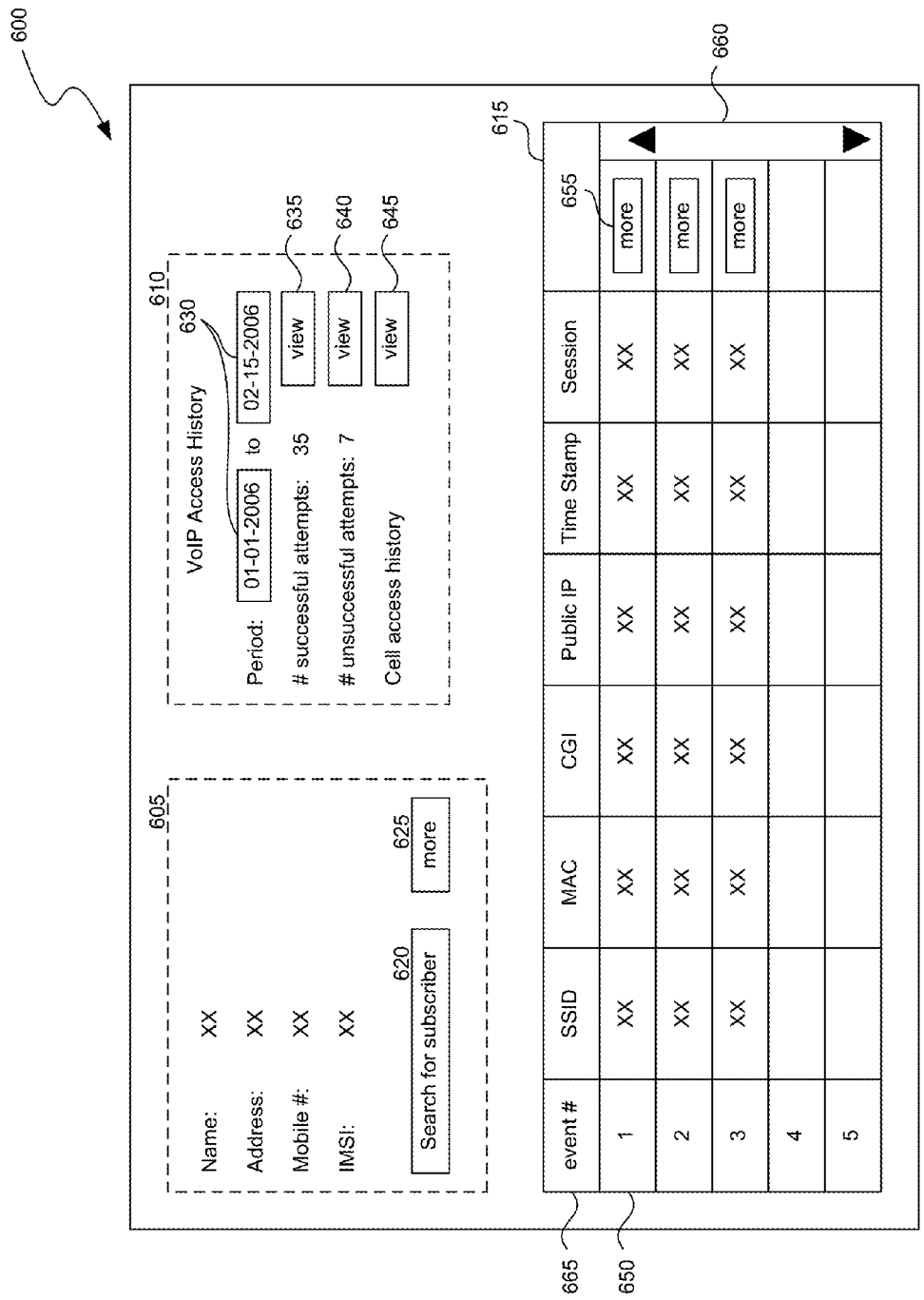
FIG. 7 is a screenshot of a representative interface for accessing a subscriber history in a VoIP system.

The facility continually updates the subscriber history table 400 as the subscriber utilizes his or her mobile device and attempts to access the service provider's VoIP service. At the same time, the subscriber history is made available to service support providers to enable service support representatives to assist the subscriber if the subscriber is unable to access the VoIP service or has difficulties with the VoIP service. FIG. 7 is a screenshot of a representative application program display 600 that allows a service support representative to view the subscriber's history in order to troubleshoot problems or respond to subscriber or other inquiries.

The service support application display is divided into three regions: a subscriber information region 605, a VoIP access summary region 610, and a detailed VoIP reporting region 615. The subscriber information region 605 displays a number of pieces of pertinent subscriber information that the service support representative may desire to see at a glance, including the subscriber name, address, mobile telephone number, and mobile device or subscriber identifier (e.g. an IMSI number). A search button 620 is provided that takes the service support representative to a search form (not shown) where the representative can search for a different subscriber using a variety of queries, such as by mobile device or subscriber identifier. A "more" button 625 takes the service support representative to additional data screens associated with the subscriber, such as a billing history screen or screens related to other services received by the subscriber.

The second region on the application display 600 is the VoIP access summary region 610. The VoIP access summary region depicts statistical summaries of the subscriber's connection requests over a defined period. The service support representative is allowed to define the summary period by entering a date range in two date fields 630. When the application display is first presented to the service support representative, the date range may be a default range such as the previous thirty day period. The number of successful VoIP service requests during the period in question is displayed in the access summary region, as are the number of unsuccessful service requests. A button 635 is provided next to the number of successful requests and a button 640 is provided next to the number of unsuccessful requests. Selecting either button 635 or 640 causes the details of the corresponding requests to be displayed in the detailed VoIP reporting region 615. That is, selecting button 635 causes details of the successful connection requests to be displayed in reporting region 615, and selecting button 640 causes details of the unsuccessful connection requests to be displayed in reporting region 615. Depending on the storage capacity of the service provider systems, the amount of data stored pertaining to successful and unsuccessful requests may be limited by the facility. For example, only the most recent twenty requests may be stored for subsequent analysis by a service support representative. A cellular access "view" button 645 is also provided in the VoIP access summary region 610 that, when depressed, displays a reporting screen that relates to the customer's attempts to access the service provider's cellular network. In this fashion, the service support representative may quickly and easily switch between viewing the VoIP history and the cellular history of a subscriber.

The third region on the application display 600 is the detailed VoIP reporting region 615. The detailed VoIP reporting region displays a list of details about the successful service requests or the unsuccessful service requests, depending on whether button 635 or button 640 was last depressed. Each row 650 in the detailed VoIP reporting region corresponds to a single connection request. An event number 665 is assigned to each row so that the connection requests can be more readily distinguished. The facility populates the details about each connection request with data obtained from the subscriber history database 230. The displayed data may comprise the SSID associated with each connection request, the MAC address of the access point, the CGI of nearby cells, the public IP address serving the access point, and the starting time stamp and length of the session. A service support representative is allowed to view additional details about each connection request by selecting a "more" button 655 that is associated with the request. Selecting the "more" button causes additional details about the connection request to be displayed, such as services accessed by a subscriber during a session after the request is authorized. Such data is also obtained by the facility from the customer history database.

The service support representative is provided a number of ways to manipulate the data that is presented in the detailed VoIP reporting region 615. A scroll control 660 is provided to allow the service support representative to scroll up and down in the list of connection requests until a desired connection request is identified. Selecting one of the column headings in the reporting region 615 causes the connection requests to be sorted in accordance with the selected heading. For example, selecting the heading "MAC" in the column heading causes the connection requests to be sorted in ascending or descending order in accordance with the MAC address associated with each connection request. Those skilled in the art will appreciate that other ways to manipulate the displayed data, such as horizontal scroll bars, keyword searching, and other techniques may also be used by the facility. Moreover, while the application display 600 depicts a listing for connection requests that were successful and a separate listing for connection requests that failed, those skilled in the art will appreciate that all connection request outcomes may be displayed in a single table with the outcome of the connection request indicated by the use of underlining, highlighting, font, colors (e.g. successful requests may be highlighted green and unsuccessful requests may be highlighted red), or other marking.

Since the subscriber history database 230 is accessed on a continuing basis, and since the service support application derives its data from the history database, the data that is presented to the service support representative is a timely and accurate picture of the access successes and failures being experienced by the subscriber. By aggregating all of the data in a single location, and by presenting data about the connection requests that succeeded as well as failed, the service support representative is provided with sufficient information to allow the representative to troubleshoot service problems or otherwise assist the subscriber. The disclosed facility thereby improves the overall subscriber experience when utilizing a VoIP service. The data in the subscriber history database may be used for other purposes as well, such as for analyzing when an access point was first used in order to start a warranty period on the access point.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples, and alternative implementations may employ differing values or ranges.

The teachings of the methods and system provided herein can be applied to other systems, not necessarily the system described above. The elements and acts of the various embodiments described above can be combined to provide further embodiments.

While certain aspects of the technology are presented below in certain claim forms, the inventors contemplate the various aspects of the technology in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the technology.

We claim:

1. A non-transitory computer-readable medium containing instructions that, when executed on a processor, cause the processor to implement a method of providing a service support representative with an interface for viewing an access history by a user of a mobile communication device to an IP-based wireless telecommunications network, the method comprising:
   receiving via one or more wireless access points a plurality of connection requests to access an IP-based wireless telecommunications network from a mobile communication device that is capable of transmitting and receiving communications via an IP-based wireless telecommunications network,
      wherein each of the plurality of connection requests includes one or more identifiers,
      wherein some of the plurality of connection requests result in the mobile communication device failing to access the IP-based wireless telecommunications network because the mobile device is not authorized to access the IP-based wireless telecommunications network; and
      wherein the mobile communication device is assigned an IP address when it successfully accesses the IP-based wireless telecommunications network;
   storing the one or more identifiers associated with each of the plurality of connection requests;
   storing data associated with attempts by the mobile communication device to access a cellular network;
   providing the interface for a service support representative to view the stored one or more identifiers associated with at least a portion of the plurality of connection requests and the data associated with attempts by the mobile communication device,
      wherein the requests include both a request to directly access the cellular network and a request to indirectly access the cellular network through another wireless network; and
   allowing the service support representative to view the stored one or more identifiers associated with connection requests that failed,
      wherein the one or more identifiers are selected from a group consisting of a mobile device identifier, a subscriber identifier, an International Mobile Subscriber Identifier, a service set identifier, or a Cell Global Identifier, and
      wherein another identifier is selected from a group consisting of a Media Access Control address, a public IP address, and a private IP address.

2. The non-transitory computer-readable medium of claim 1, wherein the interface allows the service support representative to view stored identifiers associated with connection requests that were granted access.

3. The non-transitory computer-readable medium of claim 1, wherein the mobile device is not authorized to access the IP-based wireless telecommunications network because it is associated with a blocked identifier.

4. The non-transitory computer-readable medium of claim 1, wherein the method further comprises providing search functionality to allow the service support representative to search the one or more identifiers.

5. The non-transitory computer-readable medium of claim 1, wherein the method further comprises providing filtering functionality to allow the service support representative to filter the one or more identifiers associated with each of the plurality of connection requests and the data associated with attempts by the mobile communication device to access the cellular network.

6. The non-transitory computer-readable medium of claim 1, wherein the filtering functionality allows the service support representative to filter by a date range associated with the plurality of connection requests, and a date range of the attempts by the mobile communication device to access the cellular network.

7. The non-transitory computer-readable medium of claim 1, wherein the IP-based wireless telecommunications network is an unlicensed mobile access (UMA) network.

8. The non-transitory computer-readable medium of claim 1, wherein the interface permits use of a subscriber access history to start a warranty period for an access point.

9. The non-transitory computer-readable medium of claim 1, wherein the interface permits updating a subscriber history table with new CGI values to allow for billing and support services.

10. A system for providing a service support representative with an interface for viewing an access history by a user of a mobile communication device to an IP-based wireless telecommunications network, the system comprising:
means for receiving via one or more wireless access points a plurality of connection requests to access an IP-based wireless telecommunications network from a mobile communication device that is capable of transmitting and receiving communications via an IP-based wireless telecommunications network, each of the plurality of connection requests including one or more identifiers,
wherein some of the plurality of connection requests result in the mobile communication device failing to access the IP-based wireless telecommunications network because the mobile device is not authorized to access the IP-based wireless telecommunications network; and
wherein the mobile communication device is assigned an IP address when it successfully accesses the IP-based wireless telecommunications network;
means for storing the one or more identifiers associated with each of the plurality of connection requests;
means for storing data associated with attempts by the mobile communication device to access a cellular network; and
means for providing the interface for a service support representative to view the stored one or more identifiers associated with at least a portion of the plurality of connection requests and the data associated with attempts by the mobile communication device,
wherein the requests include both a request to directly access the cellular network and a request to indirectly access the cellular network through another wireless network; and
allowing the service support representative to view the stored one or more identifiers associated with connection requests that failed,
wherein the one or more identifiers are selected from a group consisting of a mobile device identifier, a subscriber identifier, an International Mobile Subscriber Identifier, a service set identifier, or a Cell Global Identifier, and
wherein another identifier is selected from a group consisting of a Media Access Control address, a public IP address, and a private IP address.

11. The system of claim 10, wherein the mobile device is not authorized to access the IP-based wireless telecommunications network because it is associated with a blocked identifier.

12. The system of claim 10, further comprising means for providing search functionality to allow the service support representative to search the one or more identifiers.

13. The system of claim 10, wherein the interface permits updating a subscriber history table with new CGI values to allow for billing and support services.

14. The system of claim 10, wherein the interface permits use of a subscriber access history to start a warranty period for an access point.

15. A method of providing a service support representative with an interface for viewing an access history by a user of a mobile communication device to an IP-based wireless telecommunications network, the method performed by a processor executing instructions stored in a memory, the method comprising:
receiving via one or more wireless access points a plurality of connection requests to access an IP-based wireless telecommunications network from a mobile communication device that is capable of transmitting and receiving communications via an IP-based wireless telecommunications network, each of the plurality of connection requests including one or more identifiers,
wherein some of the plurality of connection requests result in the mobile communication device failing to access the IP-based wireless telecommunications network because the mobile device is not authorized to access the IP-based wireless telecommunications network; and
wherein the mobile communication device is assigned an IP address when it successfully accesses the IP-based wireless telecommunications network;
storing the one or more identifiers associated with each of the plurality of connection requests;
storing data associated with attempts by the mobile communication device to access a cellular network;
providing the interface, generated via the processor executing instructions stored in the memory, for a service support representative to view the stored one or more identifiers associated with at least a portion of the plurality of connection requests and the data associated with attempts by the mobile communication device,
wherein the requests include both a request to directly access the cellular network and a request to indirectly access the cellular network through another wireless network; and
allowing the service support representative to view the stored one or more identifiers associated with connection requests that failed,
wherein the one or more identifiers are selected from a group consisting of a mobile device identifier, a subscriber identifier, an International Mobile Subscriber Identifier, a service set identifier, or a Cell Global Identifier, and
wherein another identifier is selected from a group consisting of a Media Access Control address, a public IP address, and a private IP address.

16. The method of claim 15, wherein the interface allows a service support representative to view stored identifiers associated with connection requests that were granted access.

17. The method of claim 15, wherein the mobile device is not authorized to access the IP-based wireless telecommunications network because it is associated with a blocked identifier.

18. The method of claim 15, further comprising providing search functionality to allow the service support representative to search the one or more identifiers.

19. The method of claim 15, further comprising providing filtering functionality to allow the service support representative to filter the one or more identifiers associated with each of the plurality of connection requests and the data associated with attempts by the mobile communication device to access the cellular network.

20. The method of claim 15, wherein the interface allows for updating a subscriber history table with new CGI values to allow for billing and support services.

21. The method of claim 15, wherein the interface allows use of a subscriber access history to start a warranty period for an access point.

* * * * *